United States Patent Office 3,199,652
Patented Aug. 10, 1965

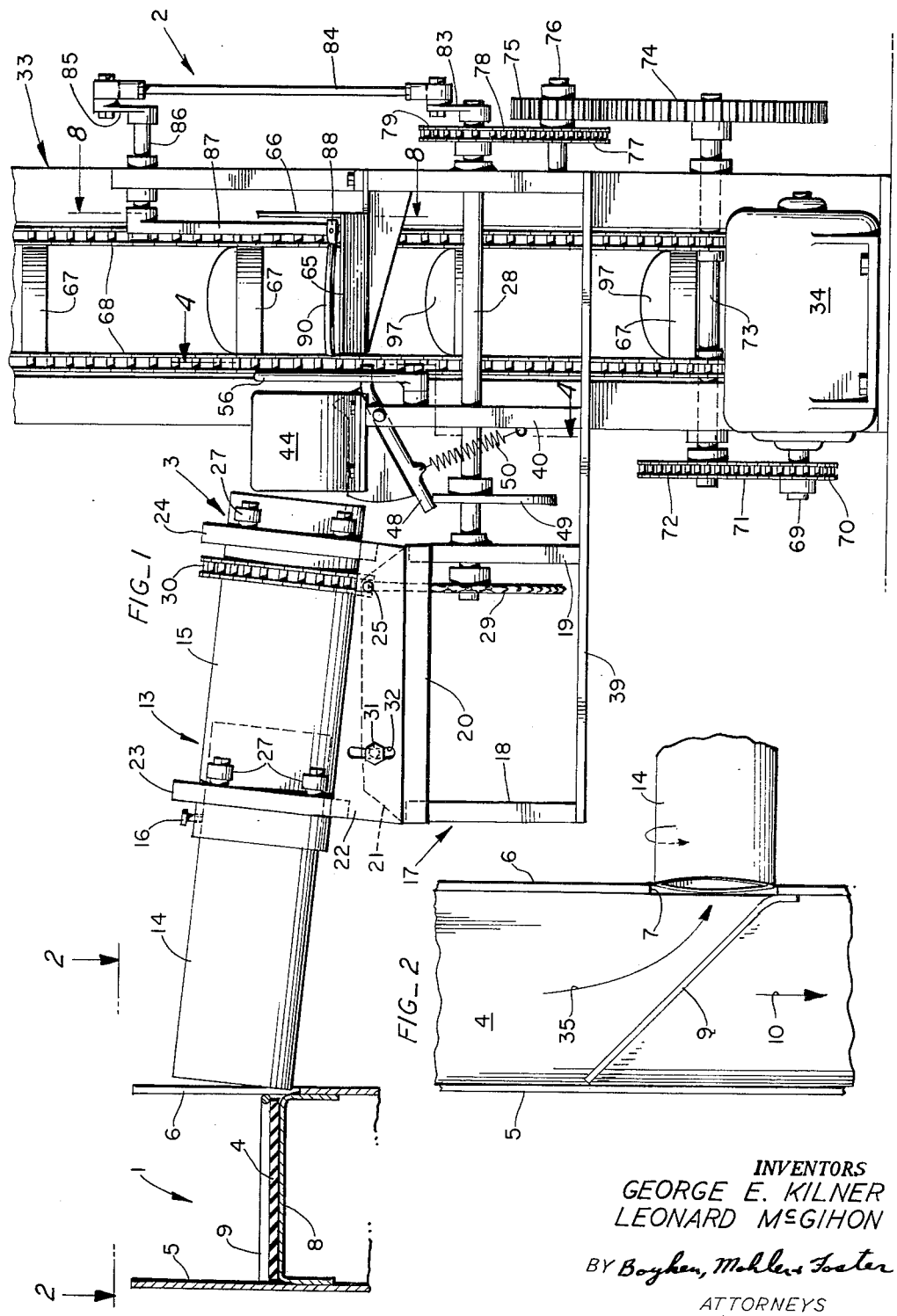

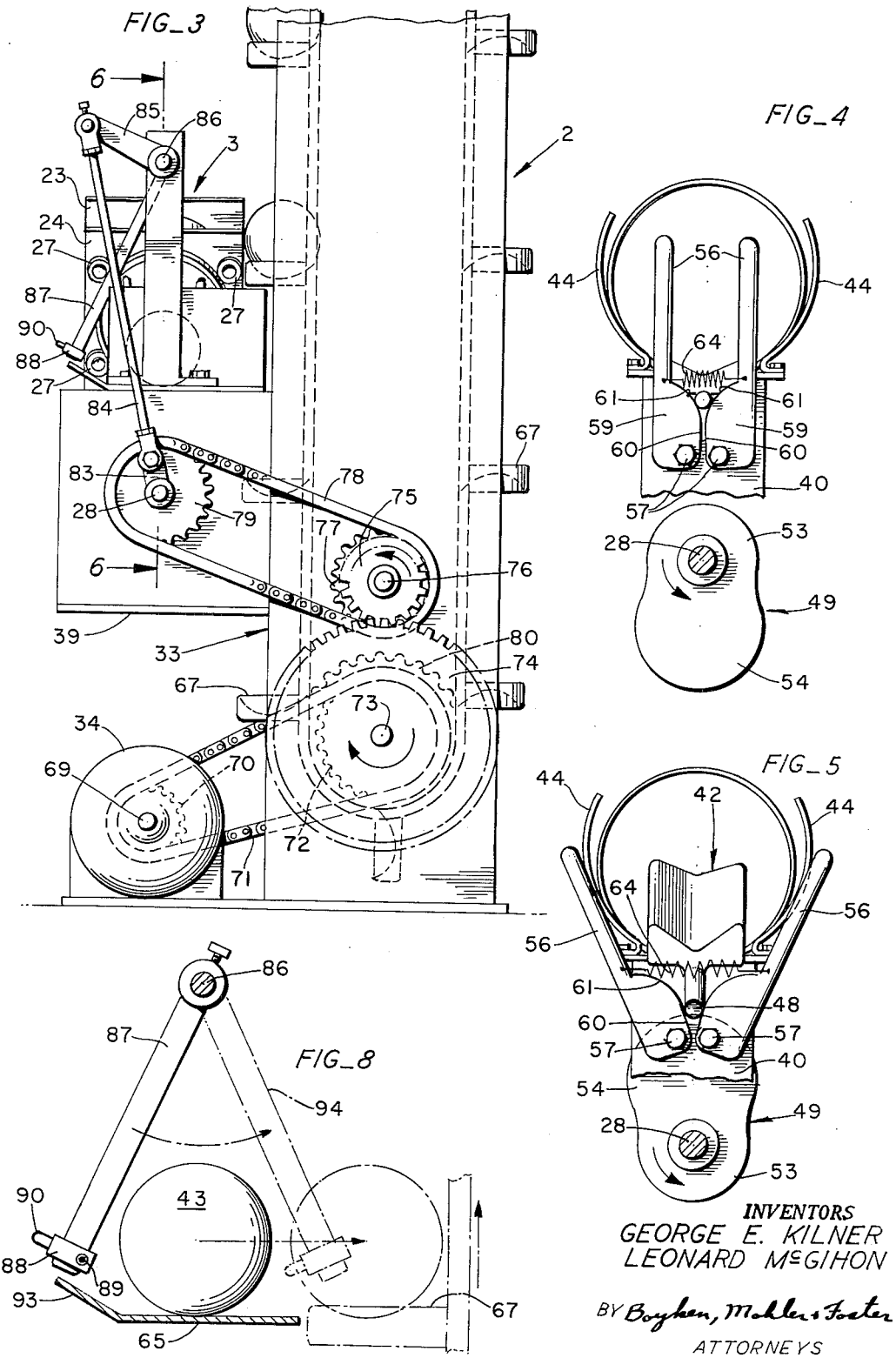

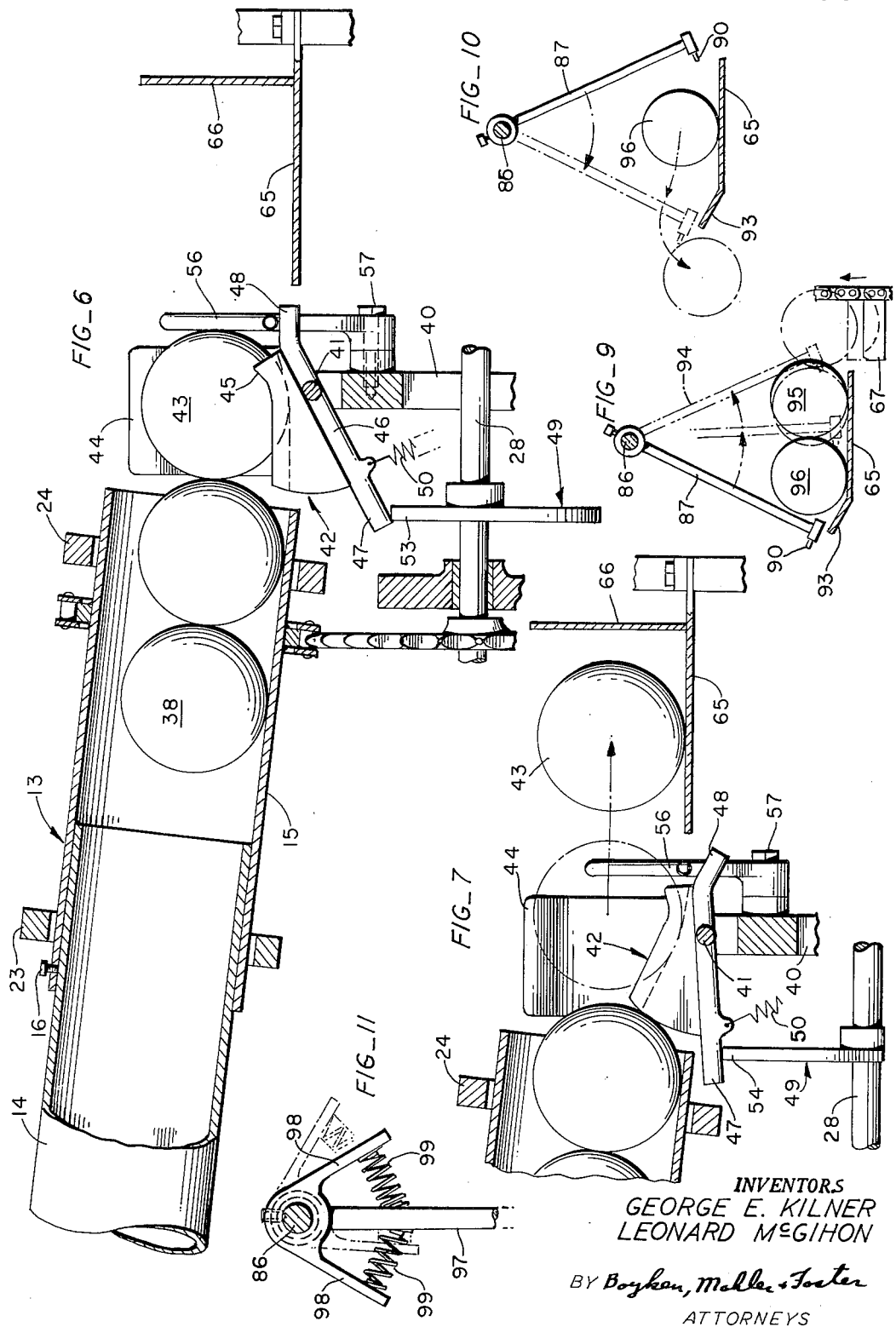

3,199,652
FEEDER
George E. Kilner, Oakland, and Leonard McGihon, San Leandro, Calif., assignors to Filper Corporation, San Ramon, Calif.
Filed Mar. 14, 1962, Ser. No. 179,552
15 Claims. (Cl. 198—34)

This invention relates to a feeder for successively feeding generally spherical fruit bodies, such as peaches, etc., at uniform intervals of time at a discharge point or station, and has for one of its objects the provision of such a feeder that is more economical to make and to maintain than feeders heretofore provided for the same purpose.

Another object of the invention is the provision of a feeder of the type mentioned above, that is more reliable than prior feeders intended for the same purpose, and which feeder is compact and is adapted to feed fruit bodies of different sizes, and which feeder is readily adapted for use in different combinations where successive, uniform timed feeding is required.

A still further object of the invention is the combination of a conveyor for carrying generally spherical fruit bodies in indiscriminate arrangements along a path of travel, and a fruit handling machine having uniformly spaced fruit supports spaced from and movable past a predetermined point at uniformly timed intervals, and a feeder adapted to automatically receive fruit bodies from said conveyor and to conduct said bodies in single file and in engaging relation to a point adjacent to the path of travel of said supports, and to accurately move the leading fruit body in said file into each support as it moves therepast.

An added object of the invention is the provision of a feeder that is free from the objections heretofore found in available feeders intended to accomplish substantially the same purpose.

One example of a place where the present feeder is used is in combination with a conventional fruit conveyor and a fruit orienting machine. The conveyor and orienting machine are merely examples, particularly with respect to the latter. In the fruit orienting machine illustrated, equally spaced fruit supports in a row are moved at a predetermined rate of speed, longitudinally of said row, past a loading station. The conveyor may carry indiscriminately arranged fruit units of indifferent numbers in a layer past the receiving end of the present feeder.

The problem in such an example is to provide a feeder that will automatically receive fruit units one at a time and successively, from said belt conveyor, without jamming, and discharge them, in succession, onto each of said supports.

Instead of a fruit orienting machine, a pitter, fruit halver or any other device may be the machine or device to which the fruit units are fed, and which machine or other device is provided with means for receiving the fruit or operating on the fruit at uniform time intervals.

Heretofore feeders intended to accomplish the results of the present feeder have been lacking in one or more important respects. They have either been quite complicated and expensive, or they have lacked the desired capacity, or they have been unreliable under certain occurrences that are frequently encountered in the fruit handling industry. Some have been easily damaged where unyielding objects other than fruit has been fed to them, thus necessitating stopping the fruit handling machinery until repair or replacement is effected, with the result of serious loss.

An object of the present feeder is the provision of such feeder that is simple, rugged, reliable under all conditions likely to be encountered.

Other objects and advantages will appear in the description and in the drawings.

In the drawings FIG. 1 is a side elevational view of the feeder in combination with a supply conveyor and a receiving device having supports onto which the fruit units are adapted to be successively fed as the supports pass a discharge point on the feeder.

FIG. 2 is a fragmentary top plan view as seen from line 2—2 of FIG. 1.

FIG. 3 is an end elevational view of the feeder as seen from the right hand end of FIG. 1 and which view includes the device onto which the units are fed.

FIG. 4 is an enlarged fragmentary part sectional view of the end of the feeder tube as seen from line 4—4 of FIG. 1. This view shows intermittently actuatable gate arms in closed position for restricting the movement of fruit units therepast.

FIG. 5 is a view similar to that of FIG. 4, showing the gate arms open and the fruit supporting platform tilted to roll fruit thereon between the gate arms.

FIG. 6 is an enlarged fragmentary cross sectional view taken along line 6—6 of FIG. 3 in which the fruit units are held by the gate arms of FIG. 4.

FIG. 7 is a fragmentary sectional view similar to a portion of FIG. 6 in which the gate arms are open and the fruit supporting platform tilted as in FIG. 5.

FIG. 8 is an enlarged, part sectional, part elevational view of the fruit removing device at the discharge end of the feeder as seen from line 8—8 of FIG. 1.

FIG. 9 is a reduced view similar to that of FIG. 8 illustrating the fruit removing device at the commencement of its movement to discharge a unit in an instance where a pair of units were accidentally positioned ahead of the removing device.

FIG. 10 is a view similar to that of FIG. 9 with the fruit removing device at the commencement of a return stroke after having removed one of the two fruit units seen in FIG. 9.

Referring to FIGURE 1, the numeral 1 generally designates a fruit conveyor and the numeral 2 generally designates a fruit handling or processing machine to which the fruit is to be fed, one at a time, at uniform intervals of time.

Between the conveyor 1 and the machine 2 is the present feeder, generally designated 3.

The conveyor 1 in the present instance may be a horizontally extending belt conveyor 4 (FIGURES 1, 2) extending between vertically disposed opposed side plates 5, 6 that function to retain the fruit on the belt as the belt is moved longitudinally thereof in one direction.

Normally the fruit units on the belt are indiscriminately arranged and in an indefinite number. That is, the fruit may be scattered to some extent, or grouped, or a combination of both.

In such conveyors it is customary to provide openings or gaps in one or both of the side plates 5, 6 through which fruit from the conveyor is taken off for feeding to an orienting machine or other apparatus.

In FIGURES 1, 2, the side plate 6 is formed with one such opening or gap 7 (FIGURE 2). The conveyor 4 is supported on a rigid table 8 (FIGURE 1) and a fruit deflecting rod 9 (FIGURE 2) extends obliquely across the upper surface of the belt 4. The arrow 10 in FIGURE 2 indicates the direction of movement of the belt 4, and one end of the rod 9 is secured to plate 6 at a point adjacent to the side of opening 7 that is past the gap, with respect to the direction of movement of the belt, which is also the direction of movement of fruit adapted to be carried on the belt. The rod extends outwardly over the belt in an upstream direction with respect to the flow of fruit, hence the fruit being carried on the belt will be deflected to the opening 7, but it will be moved over the rod if there is a predetermined resistance to its movement along the rod.

*Feeder (the cylinder)*

The feeder 3 comprises an elongated open-ended, hollow cylinder generally designated 13 that is preferably in two parts, one cylinder 14 telescopically extending into one end of a cylinder 15 of slightly larger diameter, each cylinder being of uniform diameter from end to end, and the cylinder being coaxial.

A set screw 16 extending through the end portion of cylinder 15 into which the cylinder 14 extends secures the cylinders together, but permits longitudinal adjustment of the cylinders relative to each other.

The cylinder 13 that is formed by the two cylindrical sections or lengths 14, 15 is generally horizontally disposed, but inclined slightly downwardly relative to vertical from the outer end of the cylindrical section 14, and said outer end extends into the opening 7 at its lower side. The outer end surface of the cylindrical section 14 is at a right angle to the central axis of the cylinder and as the lower side of the outer end of the section 14 is within the gap or opening 7 and below the level of the upper side of belt 4, it will be seen, as in FIGURES 1, 2, that some of the said outer end will extend into the space between the side plates 5, 6.

Below the larger diameter cylindrical section 15 of cylinder 13 is a supporting frame, generally designated 17 (FIGURE 1) that includes opposed end frame members 18, 19 and a horizontal upper frame member 20, the latter having a pair of opposed, horizontally extending, vertically disposed plates 21 extending upwardly therefrom that, in turn, are positioned between and respectively against, a pair of vertically disposed, horizontally extending plates 22.

The plates 22 are integrally connected at their opposite ends with a pair of cylinder supporting frame members 23, 24 (FIGURES 1, 3) through which the cylindrical section 15 rotatably extends.

The cylinder support 23 is adjacent to the upper end of the cylindrical section 15 while the cylinder support 24 is adjacent to the lower end of the cylindrical section 15.

The supports 23, 24 are in planes at right angles to the axis of the section 15, and each carries at its lower side, or the side facing toward the lower end of the section 15, a plurality of rotatably mounted roller elements 27 so positioned as to engage and support cylinder 13 for rotation (FIGURES 1, 3).

The end frame support 19 carries a bearing that rotatably supports one end of a horizontally disposed shaft 28, that is centrally below the section 15 at said one end and the central axis of the section 15 and shaft 28 are in the same vertical plane.

The end of shaft 28 that is below the lower cylindrical section 15 is also between the end frame members 18, 19, and carries a relatively large diameter sprocket wheel 29, the teeth of which are in mesh with a sprocket chain 30 that surrounds and is rigid with the lower cylindrical section 15.

The point of engagement between the upper side of sprocket wheel 29 and sprocket chain 30 is a fulcrum point for the cylinder 13 as a whole upon adjusting the angle of inclination of the cylinders. The plates 21, 22 are pivotally connected on either side of said point of engagement by aligned pivots 25, the common horizontal axes of which extend through said point of engagement (FIGURE 1), are adjacent to the lower end of the cylindrical section 15 and also adjacent to the lower end of cylinder 13 as a whole.

Plates 21, 22 at each side of the frame 17 are adjustably connected by bolts 31 that extend through an opening in each of the inside plates 21 that are rigid with the lower frame 17, and through an arcuate slot 32 in each of the outside plates that are rigid with the cylinder supporting plates 23, 24. The arcuate slots 32 are concentric with the point of engagement between the sprocket wheel 29 and chain 30, hence the inclination of the cylinder 30 can readily be adjusted by loosening the nuts on bolts 31 and swing the cylinder vertically about the point of engagement between chain 30 and sprocket wheel 29. The tooth-sprocket engagement will retain the cylinder 13 against downward movement axially thereof.

The shaft 28 is also journalled for rotation in bearings carried by frame 33 that supports the machine to which fruit is fed from the feeder, and a motor 34 is connected with shaft 28 through sprocket wheels, chains and gears, for driving the sprocket wheel 29, as will later be described more in detail.

It is sufficient, at this point, to note that fruit units deflected through the gap or opening 7 in the side plate 6 will engage a side of the end of the rotating cylinder 3 at said opening. The arrow 35 (FIG. 2) generally indicates the path of travel of a fruit unit.

The fruit 38 (FIG. 6) fed by the feeder 13 is generally spherical, and the minimum and maximum internal diameter of the cylinder 13 is less than double the diameter of the fruit to be handled by the feeder, yet greater than the maximum diameter of the fruit. Thus the fruit entering the cylinder 13 will roll down the cylinder in substantially single file, and cannot possibly become jammed side by side or one over the other.

While the direction of rotation of the cylinder 13 is indicated in FIG. 2 as being such that the fruit engaging the down-side of the end of the cylinder, with respect to the direction of movement of the conveyor 4, will tend to be rotated counterclockwise, looking into the open upper end of the cylinder, it does not appear that the direction of rotation of the cylinder makes any great difference in the manner of operation of the feeder. As soon as the fruit unit engages the end of the cylinder it quickly passes into the open upper end. The rotation of the cylinder eliminates any jamming of the fruit at the intake or fruit receiving end of the cylinder, which is one of the substantial advantages of the present structure. Also, the fact that the fruit enters the cylinder, precludes any piling of the fruit or spilling of the fruit as it moves away from the conveyor 4.

The rate of travel of the fruit through the cylinder may be controlled by varying the degree of inclination of the cylinder or by varying the rate of rotation of the cylinder. The faster the cylinder is rotated the slower the fruit will roll through it.

*Feeder (discharge mechanism)*

A base plate 39 (FIGS. 1, 3) may be part of frame 17 that supports the cylinder 13, and this base plate has a vertically disposed frame member 40 thereon projecting upwardly therefrom (FIG. 1).

A horizontal pivot 41 (FIGS. 6, 7) rockingly supports a fruit receiving table 42 for rocking about the axis of said pivot, and said pivot supports said table in a position for receiving the leading fruit body 43 (FIG. 6) thereon as soon as said body rolls out of the lower end of the cylinder 13.

The upper surface of the table 42 is V-shape, extending in the direction of movement of the fruit (FIG. 5), hence each of the fruit bodies rolling onto the table is centered thereon, although arcuate upwardly extending side plates 44 having their concave surfaces in opposed relation (FIGS. 4, 5, 6) are rigid on frame member 40 and prevent any possibility of a fruit body 43 on the table falling laterally off the latter.

The end of the table 42 that is remote from the lower end of the cylinder 13 preferably extends slightly upwardly, as indicated at 45 in FIG. 6, and the pivot 41 is substantially closer to the end 45 than to the end that is nearest to the cylinder.

Actually, pivot 41 is a pair of coaxial pivots extending oppositely outwardly from a central rod 46 (FIG. 6), and the upper end of frame 40 is split to pass rod 46 and to rotatably support the ends of pivot 41.

The upper fruit supporting surface of the table 42 is inclined in direction from front to rear of the table, relative to rod 46. The front end of the table is the end 45 (FIG. 6). The rod 46 extends divergently relative to the upper surface of table 42 in a direction from the front end of the table rearwardly, and the rear end of said rod projects rearwardly and downwardly relative to the said upper surface of said table, while the front end 48 of rod 46 projects forwardly of the front end of the table, and is substantially parallel with the upper surface of the table.

The rear end 47 of the rod 46 functions as a cam follower, being supported on the upper cam surface of a cam 49 that is secured on shaft 28 (FIGS. 1, 6), and a spring 50 connects the rod 46 with frame member 40 for yieldably holding the follower 47 in engagement with the cam 49.

The cam 49 has a semicircular lobe 53 concentric with shaft 28, the outer semicircular surface of which is the low side of cam 49, while a larger diameter, substantially semicircular lobe 54 of cam 49 is eccentrically positioned relative to the axis of shaft 28 (FIGS. 4, 5).

When the surface of the lobe 53 is in engagement with follower 47, the upper surface of table 42 is substantially horizontal in fruit receiving position as seen in FIG. 6. Upon rotation of shaft 28 the larger eccentrically disposed lobe 54 will engage follower 47 causing the table 42 to rock to the position shown in FIG. 7 in which the rear end of the table is elevated to block the oncoming fruit body that is at the exit end of the cylinder 13.

Upon the fruit body 43 (FIG. 6) rolling onto the table 42, it is seen that a pair of upstanding arms 56 (FIGS. 1, 4, 6) will prevent the fruit from rolling off the forward end of the table, and as seen in FIG. 6, the next fruit body in the cylinder 13 will tend to push the fruit body 43 toward the arms 56.

These arms 56 are pivotally supported at their lower ends on spaced horizontal, parallel pivots 57 carried by frame 40, and the lower end portions 59 of said arms have vertical, parallel cam surfaces 60 (FIG. 4) that extend arcuately away from each other at their upper ends, as at 61.

A spring 64 connects arms 56 at their lower ends at points spaced above pivots 57.

The forwardly projecting end 48 of rod 46 functions as a cam follower, since it projects between the arms 56 and when the table 42 is in the fruit receiving position of FIGS. 4 and 6, the follower 48, or forwardly projecting end of rod 46 is in engagement with the cam surfaces 61 just above the upper ends of the parallel cam surfaces 60.

When the cam 49 moves the follower 47, which is the rear end of rod 46, upwardly, the forward follower 48 will move downwardly to engage the cam surfaces 60 to swing the arms 56 apart to the position shown in FIG. 5, thereby releasing the fruit body 43 for rolling off the forward end of table 42 upon tilting the table.

As already seen, the fruit body following the leading body 43, and which will become the leading body, is stopped by the elevated rear edge of table 42 and cannot roll onto the table until the table is lowered, at which time the follower 48, or forward end of rod 46, will again have moved upwardly from between cam surfaces 60 and arms 56 will again form a gate to prevent the next fruit body from moving therepast, until they are again spread apart.

It is important to note that the arms 56 are yieldably brought back to the position shown in FIG. 4, hence no damage would result to the machine, should some foreign material become lodged between the arms. This is always a possibility in handling large quantities of fruit during the canning or fruit processing season.

*Fruit discharge means*

Upon the fruit body 43 being rolled off the forward end of the table 42 it rolls onto a horizontally disposed rigid platform 65 and substantially against a vertical plate or backstop 66 that is perpendicular to platform 65 and to the direction of movement of the fruit body as it rolls off the table 42 (FIGS. 1, 6, 7).

In the combination shown in FIG. 1, the horizontal platform is positioned to one side of the vertically extending path of travel of the horizontally disposed, vertically extending path of travel of the horizontally disposed, vertically spaced fruit receiving holders 67 of the machine 2.

This machine 2 may be substantially the same as the fruit orienting machine disclosed in United States Letters Patent No. 2,786,562 of Etheridge R. McClelland. The holders 67 are carried by a pair of endless chains 68 that extend over sprocket wheels at the upper and lower ends of the machine 2.

Shaft 69 driven by motor 34 (FIG. 1) carries a sprocket wheel 70 that is connected by a sprocket chain 71 with a sprocket wheel 72 on a shaft 73. A gear 74 on shaft 73 has its teeth in mesh with the teeth on a pinion 75 that is carried by a shaft 76, and a sprocket wheel 77 on said shaft 76 (FIG. 1) is connected by a sprocket chain 78 (FIGS. 1, 3) with a sprocket wheel 79 that is on shaft 28 (FIG. 3).

The sprocket chains 68 that carry the fruit holders 67 extend around sprocket wheels 80 (FIG. 3) are on shaft 73.

Referring to FIG. 8, a vertically upwardly moving holder 67, indicated in dot-dash line, is seen in relation to the platform. The backstop 66 is parallel to the path of travel of the holders, and for the fruit on the platform to be moved onto the holders as the latter move past the platform, the direction of movement of the fruit must be at a right angle to the path of movement of the fruit as it moves through the cylinder 13 and across the table 42.

In referring to the platform 65, the forward edge will be the edge adjacent to the path of holders 67, while the rear edge will be the edge opposite thereto.

Secured on the end of shaft 28 that is opposite to the end carrying the sprocket wheel 29 is one end of an arm 83 (FIGS. 1, 3), the other end of which is pivotally connected with the lower end of an upwardly extending connecting rod 84. The upper end of connecting rod 84 is pivotally connected to the outer end of an arm 85, the inner or opposite end of which arm 85 is secured to one end of a shaft 86. Shaft 86 is journalled for rotation on a portion of the feeder frame at a point above the level of platform 65. A pendulum-like arm 87 is adjustably secured at its upper end to shaft 86 (FIGS. 1, 3, 8). A collar 88 is adjustably secured to the lower end of arm 87 by a set screw 89, or by any other suitable means, and a laterally projecting fruit ejecting rod 90 is secured at one end thereof to the collar 88.

The rod 90 is preferably bowed longitudinally thereof and extends across the platform 65 (FIG. 1) adjacent to but slightly spaced above the upper surface of the latter.

As seen in FIG. 8, the rear marginal portion 93 of platform 65 extends slantingly upwardly, and at the rear end of the stroke of the arm 87 the rod 90 is over this marginal portion. At the opposite end of the stroke of arm 87, the rod 90 will be substantially over the outer edge of the upwardly moving fruit support 67 that is on the machine 2.

Oscillatory movement of the arm 87 is effected by the oscillatory rotary movement of the shaft 86 as the arm 85 is oscillated by connecting rod 84.

The concavely curved side of the rod 90 faces the fruit body 43 upon the latter being rolled from the position seen in FIG. 6, onto the platform 65 as seen in FIG. 7.

FIG. 8 illustrates a normal discharge action of the fruit ejecting rod. Upon the fruit body 43 being rolled onto the platform 65 ahead of the discharge rod 90, said body will be quickly moved onto the holder 67 upon the arm 87 swinging to the dot-dash line discharge position 94 and the arm and rod 90 will then be returned to the full line position (FIG. 8) before the next fruit body is rolled onto the platform 65. The position of the rod 90 relative to the platform 65 may be varied by moving the collar 88 to the desired position on the rod and then securing it in said position by set screw 89. Usually the rod 90 is positioned to engage the rear surface of the fruit body at a level below the center of the fruit. The reason for this position is seen in FIGS. 9, 10.

In the event two fruit bodies, designated 95, 96 should accidentally be fed onto the platform 65, they will both be ahead of the rod 90 and will automatically be positioned generally on a line extending between the front and rear edge of the platform, since there is not room for both to be on the platform in any different alignment. The body 95 is illustrated as being closest to the front edge of the platform.

Due to the upward inclination of the rear marginal portion 93 of the platform, neither body will roll off the platform without being pushed or knocked off.

Upon the arm 98 swinging to the dot-dash position 94 the rod 90 will move below the fruit body 96 after body 95 has moved to its position in support 67, since body 95 cannot go further due to the back plate 97 on machine 2 that is alongside chains 68. Upon return movement of the arm 87 to its full line position, the fruit body 96 will be ejected by rod 90 over the marginal portion 93, as seen in FIG. 10. Thus the platform 65 will be cleared of fruit so there will be no jamming, should an extra fruit body be fed onto the platform.

FIG. 11 illustrates a modification of the pendulum arm 87, the said arm being designated 97. This arm carries an ejector rod at its lower end the same as arm 87. The upper end of arm 97, however, is rotatably supported on shaft 86. Secured rigid on the shaft by a suitable set screw is an inverted V-shaped member, the said shaft 86 extending through an opening in said member at the juncture of the arms 98 that extend divergently downwardly therefrom. A compression spring 99 is disposed between each arm 98 and each of the two opposite sides of the arm 97 thereby yieldably holding the arm 95 centrally between the divergent lower ends of arms 98. By this structure, in the event the ejector rod at the lower end of the arm 97 should engage some foreign object that might accidentally be fed onto the platform, no damage would occur, since the arm 97 would yield, rather than bend or break. The tension of springs 99 would, of course, be adequate to resist compression in engaging the fruit.

While the operation of the feeder is believed to be clear from the description, it may be summarized as follows.

Rollable fruit bodies in indiscriminate arrangement on conveyor 4 are deflected into the upper end of the rotary cylinder 13 and roll down the cylinder in single file.

If the rocking table 42 is substantially horizontal, as seen in FIG. 6, at the time the leading fruit body reaches the lower end of cylinder 13, it will roll onto the table and against the gate formed by arms 56, since said arms extend across the end of the table when the table is substantially horizontal.

If the table 42 is tilted, as seen in FIG. 7, which is the position of the table when the gate, formed by arms 56 is open, then the leading fruit body will be blocked by the rear edge of the tilted table and will be held in the lower end of the tube or cylinder 13 until the table rocks back to its horizontal position, and the fruit will then roll onto the table.

Usually a file of fruit units will be in the rotating cylinder 13, hence the leading fruit unit at the lower open end of the file that is in the cylinder, will roll at uniform time intervals onto the table 42, and will then be rolled off the table onto the platform 65.

Upon each oscillatory movement of the fruit ejecting rod 90, the fruit body on the platform 65 will be ejected from the platform and into the support 67 that is moving past the platform.

The rotation of the cylinder 13 causes the fruit bodies to continuously roll down the cylinder, even though the latter is at a relatively slight incline, and in so rolling, the fruit does not jam or become injured, but readily rolls out of the lower end of the cylinder.

The rocking of table 42, the opening and closing of gate arms 56, and the swinging of the ejection rod 90 are all synchronized to the movement of the supports 67 on machine 2 to deposit a fruit body onto each support 67 at exactly the right moment, without injury to the fruit or jamming of the fruit and without injury to any portion of the machine should some foreign object be fed into the feeder.

The installation of the feeder is readily accomplished since the upper cylindrical section 14 may be moved axially to any desired extended position relative to the section 15, and the tilt of the cylinder 13 may be quickly adjusted by loosening the bolts 31 and tilting the cylinder about the upper point on sprocket 29 and retightening the bolts.

It is, of course, obvious that the use of the feeder is not necessarily restricted to a fruit orienting machine of the type that is generally shown herein, or as shown in said U.S. Patent No. 2,796,562.

The method, as hereinabove described, may be said to be one in which the generally spherical articles 38 (FIG. 6) are rolled in single file in engaging relation down an inclined path of travel (tube 13) in a direction longitudinally of the file and said path from the upper end of said path to a discharge station 65, spaced outwardly of the lower end of said path whereby the lowermost article in said path will be the leading article. Obviously, as the "leading article" is removed from the lower end of said path the next one will be the leading one in said path.

The leading article is successively spaced (FIG. 7) a uniform distance from the others as it leaves said path and it is then moved at uniform intervals of time to the said discharge station (on platform 65), and immediately thereafter each article is quickly moved laterally from said discharge station onto one of the article supports 67 as the latter move at uniform intervals past said discharge station.

Since the rod 90 swings rather quickly in its arc, and engages the article at the discharge station at a point on the side of the article below the level of the center thereof, the article is quickly slid off the platform 65 through the short distance between the support 67 and the point where it is supported on said platform, substantially without rolling, thus eliminating any tendency of the object to spin and to climb out of the support 67, or to roll irregularly due to deformity in the surface contour of the article.

The concave side of rod 90 engages the fruit or article, and thus the latter is automatically centered with respect to the ends of the curved portion so that the article will move directly onto the center of the support 67.

The method may also be said to include the step of restraining articles in the aforesaid inclined path against movement of any of the articles to a position on top of others since the inside diameter of the tube with respect to the minimum diameter of the articles to pass through the tube is such that the articles must not only remain in single file, but they cannot wedge themselves. Contributing to this latter result is the fact that the articles are rolled about axes that extend transversely of the longitudinal axis of the file of articles in the tube as the articles move from the elevated end of the path to the lower end. Heretofore, special and relatively complicated movements have been introduced to prevent articles from piling on top of each other, or becoming displaced and moving to one side or the other of the single file during movement of articles generally longitudinally of the file.

The use of the term "generally spherical" fruit bodies is intended to include all rollable bodies, having a generally spherical contour in one plane, since it is obvious that fruit such as pears, which are elongated on their stem-blossom axes, will readily roll through the cylinder 13. Normally in such a case the tilt of the cylinder may be greater than is illustrated, which is one of the reasons for providing means enabling the tilt of the cylinder to be varied.

Insofar as the apparatus or feeder itself is concerned, the claims are intended to cover all changes and modifications of the example of the invention herein chosen for purposes of disclosure which do not constitute departures from the spirit and scope of the invention.

We claim:

1. In a fruit feeder for rollable whole fruit bodies, including a fruit receiving station and a fruit discharge station laterally spaced from said fruit receiving station at a lower level than the latter;
   (a) an elongated, open ended, hollow cylinder through which said fruit bodies are adapted to roll from one end thereof to the other end and through said ends;
   (b) cylinder supporting means supporting said cylinder for rotation about its longitudinal axis in an inclined position relative to horizontal with said one end of said cylinder at said receiving station for receiving said bodies and with said other end adjacent to said discharge station;
   (c) the inside diameter of said cylinder being greater than the maximum diameter of fruit bodies adapted to roll therethrough and less than double the minimum diameter of said bodies whereby said bodies will be restrained for movement therethrough in substantially a single file;
   (d) cylinder rotating means connected with said cylinder for rotating it about its longitudinal axis,
   (e) fruit spacing means adjacent to said other end of said cylinder supported for movement to and from a position for alternately holding and releasing each fruit body as it moves out of said other end for spacing each body so released from the next one thereto in the file that is within said tube,
   (f) and actuating means connected with said fruit spacing means for so moving the latter.

2. In the combination as defined in claim 1,
   (g) said fruit spacing means comprising a generally horizontally positioned table onto which each fruit body in said cylinder is adapted to roll in a direction substantially in continuation of the axis of said cylinder and which table has a rear edge adjacent to said other end of said cylinder and a forward edge at the side opposite to said rear edge;
   (h) means supporting said table for rocking from said generally horizontal position thereof to a tilted position in which said rear edge is elevated, and vice versa whereby a fruit body on said table will roll over said forward edge and said rear edge will obstruct the next fruit body in said file from movement onto said table when the latter is in said tilted position and until said table is rocked back to said generally horizontal position, and
   (i) table actuating means operably connected with said table for so rocking it.

3. In the construction as defined in claim 1,
   (g) said cylinder comprising a pair of coaxial cylindrical sections in which the uppermost thereof is telescopically fitted within the other section to enable relative axial movement between said sections for varying the overall length of said cylinder;
   (h) means releasably securing said sections together at any degree of extension of one relative to the other;
   (i) said supporting means including adjusting means movable for varying the elevation of said one end of said cylinder relative to said other end independently of any adjustment of said cylinder rotating means.

4. In the combination as defined in claim 1;
   (g) said cylinder rotating means comprising an annular tooth engaging member secured to and around said cylinder adjacent to said other end thereof and coaxial therewith, and
   (h) a power driven toothed wheel below said cylinder having its teeth in engagement with said member whereby the tilt of said cylinder may be varied by rocking it about the point of engagement between said toothed wheel and said member,
   (i) and said cylinder supporting means including adjustably connected supporting elements movable relative to each other for so rocking said cylinder to vary its inclination and pivot means supporting said cylinder for rocking about a horizontal axis extending through said point of engagement.

5. In a construction as defined in claim 2,
   (j) gate means adjacent to said forward edge of said table in a fruit restraining position for holding a fruit body on said table against rolling off the latter over said forward edge when said table is horizontal;
   (k) gate supporting means supporting said gate means for movement from said fruit restraining position to a fruit releasing position in which a fruit body on said table is free to roll therefrom over said forward edge, and
   (l) gate actuating means operably connected with said table actuating means for moving said gate means from said fruit restraining position to said fruit releasing position upon actuation of said table actuating means for moving said table to its tilted position.

6. In a feeder for feeding single generally spherical fruit bodies at uniform time intervals from a discharge point that includes a generally horizontally disposed platform onto which such bodies are adapted to be positioned at said discharge point at substantially uniform time intervals;
   (a) a horizontally elongated rod,
   (b) an arm secured at one end thereof to one end of said rod and extending upwardly from said one end of said rod,
   (c) supporting means supporting said arm at the upper end of the latter for swinging thereof about said upper end for oscillatory movement of said rod in a direction transversely of the latter across the upper side of said platform from a position at one side of a fruit body at said discharge point and adjacent to one edge of said platform toward the opposite edge of said platform for moving such fruit body off said platform,
   (d) means connected with said arm for so swinging said arm,
   (e) said supporting means supporting said arm with said rod relatively close to said platform for engaging each fruit body at a point below the level of the center of each body, whereby said rod will be adapted to elevate a body on said platform and to pass below the latter in the event of an obstacle to so moving said body off said platform, and
   (f) said platform being unobstructed along said one edge to discharge of a fruit body therefrom, whereby such last mentioned fruit body will be discharged over said one edge upon return of said rod to its position adjacent to said one edge thereby clearing said platform for deposit of another body thereon at said discharge point.

7. A feeder for receiving fruit bodies at a receiving station at indeterminate times and relation to each other and for discharge of said bodies at a discharge station individually at uniform time intervals, comprising, in combination;
(a) an elongated, open ended cylinder through which such bodies are adapted to roll from one end thereof to the other and through said open ends;
(b) means supporting said cylinder inclined relative to horizontal with said one end elevated whereby said one end is the upper end and said other end is the lower end;
(c) means at said upper end adapted to feed fruit bodies singly into said one end of said cylinder in close succession for rolling in single file and in engaging relation down said cylinder to the lower open end of the latter,
(d) means connected with said cylinder for rotating it about the longitudinal axis whereby said fruit units will so roll about axes extending obliquely relative to said longitudinal axis,
(e) stop means adjacent to and extending transversely across said lower open end of said cylinder in a body engaging position for retaining said fruit bodies against free movement out of said tube and past said stop means,
(f) supporting means supporting said stop means for movement from said body engaging position to a body releasing position away from said lower open end and vice versa, for intermittently releasing the fruit body thereagainst,
(g) stop actuating means connected with said stop means for intermittently at uniform time intervals moving said stop means from said body engaging position to said body releasing position and back again;
(h) body receiving means adjacent to said stop means in a receiving position for receiving each body released from said stop means; and
(i) body ejecting means adjacent to said body receiving means supported for intermittent movement across said body receiving means for engaging a body on the latter and for moving it off said body receiving means,
(j) means supporting said body ejecting means for said movement and
(k) means connected with said body ejecting means for so moving the latter,
(l) said body ejecting means being movable in a generally horizontal direction at substantially a right angle to the direction of movement of said fruit body onto said body receiving means whereby said body ejecting means is free from obstruction, by fruit successively moved from said cylinder, to oscillatory movement over said body receiving means.

8. The combination as defined in claim 7;
(m) a conveyor including a plurality of spaced fruit supports supported for movement past said body receiving means at uniformly spaced intervals of time in a position for receiving thereon successive fruit bodies ejected from said body receiving means as said fruit supports move past said body receiving means,
(n) conveyor actuating means connected with said fruit supports for so moving them past said body receiving means, and
(o) said stop actuating means and said body ejecting means and said conveyor actuating means being connected for actuation thereof in timed relation for ejection of a single fruit unit onto each fruit support as the latter passes said body receiving means.

9. In a feed means for generally spherical fruit units and like objects that includes a frame, a conveyor belt providing a generally longitudinally disposed conveying surface, an upstanding side wall on said frame disposed to extend along one edge of said belt immediately adjacent to said conveying surface to retain said fruit units on said belt, and which side wall is provided with an opening through which fruit units on said belt are adapted to be discharged;
(a) an annular feeder having a circular fruit receiving inlet for receiving fruit units from said belt, and a discharge opening spaced therefrom through which said fruit units are adapted to be discharged, the central axis of said inlet being generally horizontally extending whereby said inlet will have lower, upper and lateral sides;
(b) means supporting said feeder with said inlet at the opening in said fence and facing said belt with the lower side of said inlet adjacent to and at approximately the level of said belt whereby such fruit units on said belt may freely pass through said opening in said fence and into said inlet for passage through said feeder to said discharge opening for discharge from the latter,
(c) means for rotating said feeder about the axis of said circular inlet whereby the portion of said feeder defining the outline of said inlet and facing said belt will be moved one direction in a circular path to prevent bridging of said inlet by fruit.

10. In the feed means as defined in claim 9,
(d) the diameter of said inlet being less than double the maximum diameter of the fruit units to be conveyed on said belt; only one fruit unit at a time can enter said inlet, and
(e) said discharge opening being substantially coaxial with said inlet, and the portion of said feeder between said inlet and said outlet being cylindrical in cross-sectional contour.

11. The method of feeding generally spherical articles from a feeding station to a discharge station that includes the steps of:
(a) presenting such articles from an indiscriminately arranged plurality thereof to said feeding station and successively moving said articles at said station through the annular sides of an annular aperture,
(b) continuously rotating the sides of said aperture in one direction about the axis of central axis thereof to thereby prevent bridging of said articles at said aperture, then
(c) rolling said articles down an elongated inclined path of travel in a direction longitudinally of the latter to said discharge station and
(d) removing said articles, one at a time at spaced uniform time intervals, from the lower end of said path.

12. In the method as defined in claim 11:
(e) the axes of rotation of said articles being respectively oblique relative to the longitudinal axis of said path while rolling down said path.

13. The method of feeding generally spherical articles to a discharge station that includes the steps of:
(a) rolling a plurality of said articles in single file down an inclined elongated enclosed path of travel and out of the lower end thereof about axes extending obliquely relative to the longitudinal axis of said path,
(b) restricting the entry of more than one article at a time into the upper end of said path and positively retaining all of the articles while in said path substantially in said single file against movement out of said file transversely of the latter, and
(c) successively spacing the leading article in said path a substantially uniform distance from the others in said enclosed path at a point adjacent to the lower end of said path.

14. In a feeder for generally spherical fruit units, such as whole peaches and the like that includes a generally horizontally extending conveyor having an upper fruit supporting surface for carrying such units thereon in one direction, and an upstanding wall extending lengthwise of and alongside said conveyor having an opening through which fruit units on said conveyor are adapted to be moved in a direction transversely of said conveyor;

(a) a feeder having an annular, laterally directed fruit receiving inlet portion for receiving fruit units from said conveyor for passage therethrough and (b) fruit supporting means extending away from said inlet portions for conducting said fruit units in single file away from said inlet portion and from said conveyor, (c) the central axis of said inlet portion being generally horizontal and extending transversely of said conveyor, (d) means supporting said feeder in a position with said inlet portion at said opening in said side wall with the lower side of said inlet portion adjacent to and approximately at the level of said fruit supporting surface of said conveyor, whereby said fruit units on said fruit supporting surface may be rolled thereon transversely of said conveyor into said inlet portion and through the latter to said fruit supporting means, in said single file on the latter for being carried away from said inlet portion and from said conveyor, (e) means connected with said inlet portion for rotating it about its axis in one direction for preventing bridging of fruit units on said conveyor at said inlet portion.

15. In the feeder as defined in claim 13:

(d) the diameter of said inlet portion being less than the diameter of the fruit units to be carried on said conveyor and greater than the maximum diameter of the units to be so conveyed, so that only one fruit unit at a time can enter and pass through said inlet portion.

References Cited by the Examiner

UNITED STATES PATENTS

| 2,618,480 | 11/52 | Williams | 198—22 X |
|---|---|---|---|
| 2,736,417 | 2/56 | Greer. | |
| 2,889,911 | 6/59 | Keesling | 198—26 |
| 3,126,087 | 3/64 | Anderson | 198—34 |

SAMUEL F. COLEMAN, *Primary Examiner.*

EDWARD A. SROKA, WILLIAM B. LA BORDE, *Examiners.*

UNITED STATES PATENT OFFICE
CERTIFICATE OF CORRECTION

Patent No. 3,199,652　　　　　　　　　　　　　　August 10, 1965

George E. Kilner et al.

It is hereby certified that error appears in the above numbered patent requiring correction and that the said Letters Patent should read as corrected below.

Column 14, line 7, for the claim reference numeral "13" read -- 14 --; line 8, for "(d)" read -- (f) --.

Signed and sealed this 5th day of November 1968.

(SEAL)
Attest:

Edward M. Fletcher, Jr.　　　　　　　　　　　　EDWARD J. BRENNER
Attesting Officer　　　　　　　　　　　　　　　Commissioner of Patents